(12) United States Patent
Garg et al.

(10) Patent No.: US 11,710,152 B2
(45) Date of Patent: Jul. 25, 2023

(54) ELECTRONIC DETERMINATION OF VIEWERSHIP BY A VEHICLE OF A MEDIA CONTENT

(71) Applicant: TEK AD OPUS INC., Fremont, CA (US)

(72) Inventors: Manish Garg, Fremont, CA (US); Suhail Zain, San Ramon, CA (US)

(73) Assignee: TEK AD OPUS INC., Fremont, CA (US)

( * ) Notice: Subject to any disclaimer, the term of this patent is extended or adjusted under 35 U.S.C. 154(b) by 0 days.

(21) Appl. No.: 17/668,355

(22) Filed: Feb. 9, 2022

(65) Prior Publication Data
US 2022/0270134 A1 Aug. 25, 2022

Related U.S. Application Data

(60) Provisional application No. 63/147,243, filed on Feb. 9, 2021.

(51) Int. Cl.
*G06Q 30/00* (2023.01)
*G06Q 30/0251* (2023.01)
*H04W 4/40* (2018.01)

(52) U.S. Cl.
CPC ......... *G06Q 30/0265* (2013.01); *H04W 4/40* (2018.02)

(58) Field of Classification Search
CPC .......................... G06Q 30/0265; H04W 4/40
See application file for complete search history.

(56) References Cited

U.S. PATENT DOCUMENTS

| | | | |
|---|---|---|---|
| 2005/0195383 A1* | 9/2005 | Breed | B60N 2/0232 356/28 |
| 2015/0332330 A1* | 11/2015 | Dawson | G06Q 30/0261 705/14.58 |
| 2016/0267532 A1* | 9/2016 | Saccoman | G06Q 30/0255 |
| 2019/0311397 A1* | 10/2019 | Binkley | G06Q 30/0266 |
| 2019/0364424 A1* | 11/2019 | Vanderveen | H04L 61/5053 |
| 2020/0288289 A1* | 9/2020 | Elnajjar | G06Q 30/0265 |
| 2020/0294432 A1* | 9/2020 | Nishimura | G06Q 30/0267 |
| 2020/0410549 A1* | 12/2020 | Buchalter | G06Q 30/0246 |
| 2021/0009032 A1* | 1/2021 | Parkes | G08G 1/017 |
| 2021/0110426 A1* | 4/2021 | Hibbard | G06Q 30/0251 |
| 2021/0390582 A1* | 12/2021 | Flack | G01C 21/3492 |

* cited by examiner

*Primary Examiner* — Meredith A Long
(74) *Attorney, Agent, or Firm* — Intelletek Law Group, PLLC; Gabriel Daniel, Esq.

(57) ABSTRACT

A method and system of determining a viewership of a media content includes displaying a media content on an outward display device. For each vehicle in a predetermined range of the outward display device, a data packet comprising data from one or more sensors of the vehicle is received. It is determined whether the vehicle is unique based on the data packet. Upon determining from the data packet that the vehicle is unique, a dwell time of the vehicle is determined with respect to the displayed media content on the outward display device.

20 Claims, 6 Drawing Sheets

ELECTRONIC DETERMINATION OF VIEWERSHIP BY A VEHICLE OF A MEDIA CONTENT

CROSS-REFERENCES TO RELATED APPLICATIONS

The present application claims the benefit of priority under 35 U.S.C. § 119 from U.S. Provisional Patent Application Ser. No. 63/147,243, entitled "Electronic Measurement of Viewership of Advertisements Displayed on Billboards, Signboards, Mobile Displays, Vehicle Mounted Displays, Etc.," filed on Feb. 9, 2021, which is hereby incorporated by reference in its entirety for all purposes.

BACKGROUND

Technical Field

The present disclosure generally relates to distribution of media content, and more particularly, to determining whether content has been displayed to a moving object.

Description of the Related Art

Content distribution is the act of promoting content to audiences in multiple media formats through various channels. Various characteristics of the consumer of this content, sometimes referred to herein as the audience, may be relevant to the transmission of targeted messages to enhance the effectiveness of content distribution campaigns created by content distribution entities. Salient characteristics in effective distribution of content include the location information of the audience, as well as time and length of consumption.

Providing content to moving vehicles is well recognized as a powerful content distribution tool. Several ways of such advertising are in practice today, such as placing a notification or advertisement on a vehicle, billboard, signboard, mobile display, vehicle mounted display, etc., collectively referred to herein as an outward display device. For example, such outward display device may be either through a wrap, painting or placing a monitor on top and having that vehicle traverse a populated route. While these advertising delivery methods do effectively display the content to a relatively large audience, it is challenging to determine whether and/or how long an audience vehicle was exposed to the content provided.

SUMMARY

According to various embodiments, a computing device, a non-transitory computer readable storage medium, and a method are provided to determine a viewership of a media content. A media content is displayed on an outward display device. For each vehicle in a predetermined range of the outward display device, a data packet is received including data from one or more sensors of the vehicle. It is determined whether the vehicle is unique based on the data packet. Upon determining that the vehicle is not unique, the process goes back to receiving a data packet for each vehicle in a predetermined range of the outward display device. However, upon determining that the vehicle is unique, it is determined, from the data packet, a dwell time of the vehicle with respect to the displayed media content on the outward display device.

In one embodiment, the outward display device is on a content delivery vehicle (CDV).

In one embodiment, the outward display device is a stationary billboard.

In one embodiment, the displayed media content is received from one or more content providers comprising a police department, a fire department, or a municipality.

In one embodiment, the data packet comprises a vehicle to vehicle (V2V) safety message from a corresponding vehicle.

In one embodiment, for each vehicle, an identification (ID) of the vehicle and at least one of a speed, a heading, a location, or a dwell time of the media content by the vehicle are determined. The ID may be a rolled ID that avoids a tracking of the corresponding vehicle.

In one embodiment, the receiver of the computing device is a vehicle-to-vehicle (V2V) receiver.

In one embodiment, the V2V receiver includes an optical wireless communication technology module using a light emitting diode (LED) transmitter and a camera receiver using a complementary metal oxide semiconductor (CMOS) image sensor.

In one embodiment, the V2V receiver is based on a radio frequency (RF) wireless communication technology having an RF receiver.

These and other features will become apparent from the following detailed description of illustrative embodiments thereof, which is to be read in connection with the accompanying drawings.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all the components or steps that are illustrated. When the same numeral appears in different drawings, it refers to the same or like components or steps.

DETAILED DESCRIPTION

Overview

In the following detailed description, numerous specific details are set forth by way of examples to provide a thorough understanding of the relevant teachings. However, it should be apparent that the present teachings may be practiced without such details. In other instances, well-known methods, procedures, components, and/or circuitry have been described at a relatively high-level, without detail, to avoid unnecessarily obscuring aspects of the present teachings.

Figure 1:
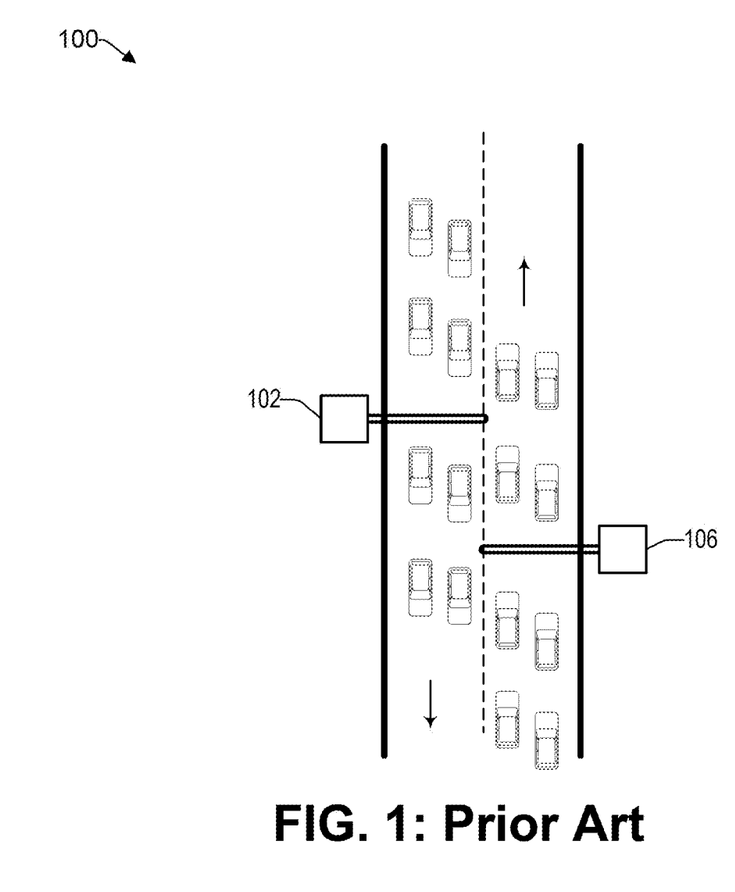
FIG. 1 illustrates an example known traffic sensor.

The present disclosure generally relates to systems and methods of determining the viewership of media content by users in a moving object (e.g., a moving vehicle), while being aware of a location, time, and direction of travel of the user. Flow or traffic is the rate at which vehicles pass a given point and is typically provided in terms of vehicles per hour. One popular way of traffic estimation relates to laying down tube sensors on the road, sometimes referred to as tube sensors, as illustrated in FIG. 1. For example, sensors 102 and 106 can gather traffic data (e.g., southbound and northbound, respectively) when vehicles are driven over the tubes. Data is typically gathered over a predetermined number of days and then analyzed. These studies involve setup time of the sensors, which may be damaged over time, as well as analysis of the harvested data. For example, such data studies may be performed by the Department of Transportation, and the results may be published in a report.

Today, the above road traffic studies are being largely replaced by analysis of anonymized cell phone network data. This process involves extracting origin, destination, route, and speed data from cell tower connection data as well as data shared by various smart phone apps. An issue with this approach is a lack of location accuracy, since the vast majority of cell phones are on the network but not being used to make a call or receive/transmit data. The software for data analysis is quite complicated because of the scale of data that is analyzed and the inferences that are made due to inaccurate data. Further, analysis of cell phone data may have a large computational overhead. Even though cell phone network data may be collected continuously, the analysis is not real time or continuous.

The teachings herein provide an accurate and computationally efficient approach to determining vehicle traffic date with respect to a display to determine the number of vehicles and the length of time a media content provided on the display is consumed. In various embodiments, the media content can be provided on a moving vehicle, referred to herein as a content delivery vehicle (CDV), or stationary display, such as a billboard, signboard etc. As used herein, a CDV is any vehicle, such as a car, truck, bus, motorcycle, boat, ship, helicopter, airplane, hovercraft, etc., that is subscribed to a media content distribution service as described herein. A surface of the CDV, such as a rear windshield, trunk, sheet metal, etc., may be used to include a display capability (e.g., a flexible LCD) that is operative to display content to other potentially moving vehicles. In some embodiments, the outward display device is attached to the vehicle as an add-on device. Both the CDV and stationary displays are collectively referred to herein as an outward display device. The techniques described herein may be implemented in a number of ways. Example implementations are provided below with reference to the following figures.

Example Architecture

Figure 2:
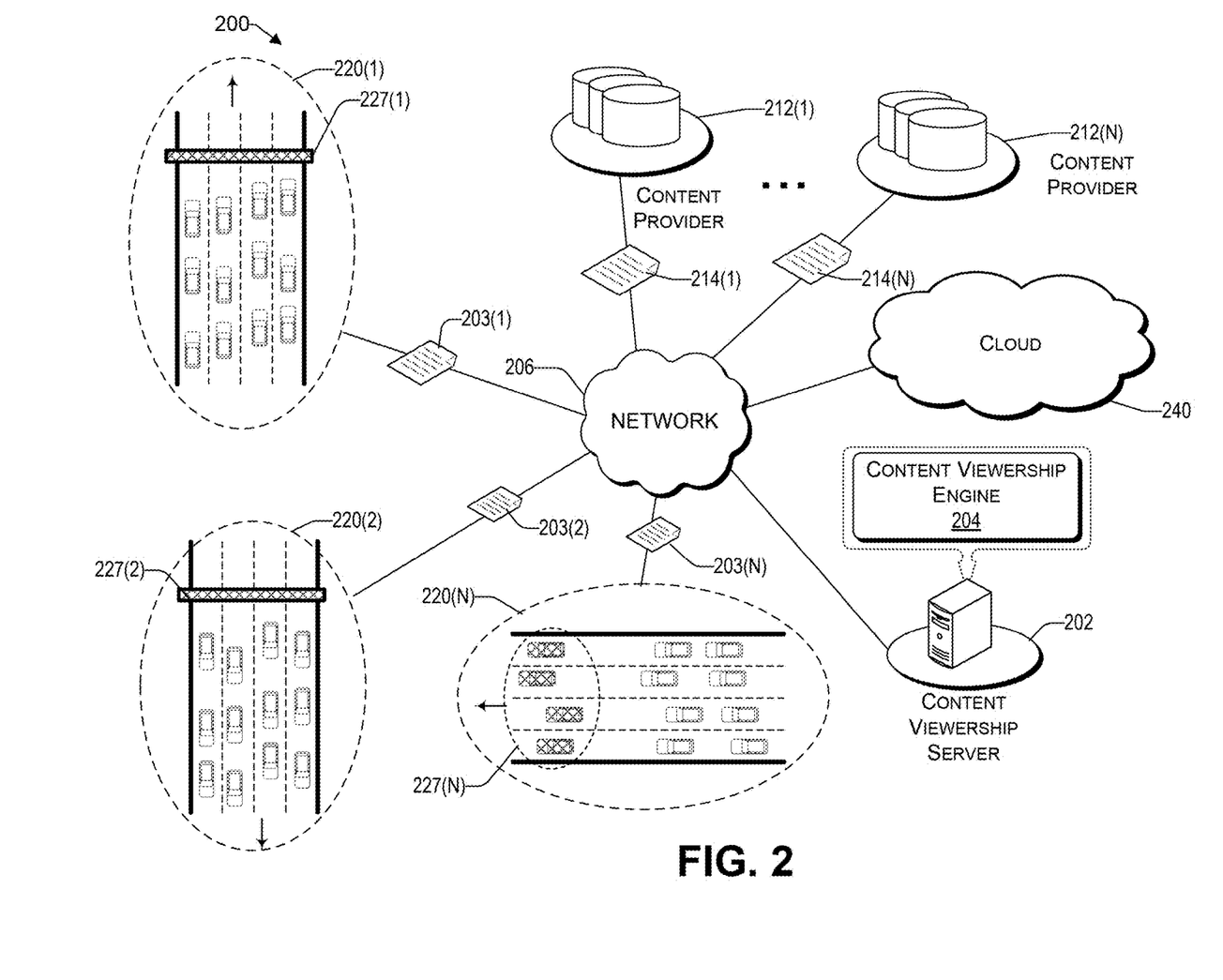
FIG. 2 illustrates an example architecture for an intelligent media content viewership determination, consistent with an illustrative embodiment.

FIG. 2 illustrates an example architecture 200 for an intelligent media content viewership determination, consistent with an illustrative embodiment. Architecture 200 includes a network 206 that allows various mobile computing devices to communicate with each other and various resources that are connected to the network 206, such as one or more content providers 212(1) to 212(N), a content viewership server 202, and a cloud 240. Today, computing devices typically take the form of portable handsets, smartphones, tablet computers, laptops, desktops, personal digital assistants (PDAs), and smart watches, although they may be implemented in other form factors, including consumer, and business electronic devices, as well as being integrated in moving vehicles.

The network 206 may be, without limitation, a local area network ("LAN"), a virtual private network ("VPN"), a cellular network, the Internet, or a combination thereof. For example, the network 206 may include a mobile network that is communicatively coupled to a private network, sometimes referred to as an intranet, that provides various ancillary services, such as communication with various application stores, libraries, and the cloud 240.

The content viewership engine 204, transforms the content viewership server 202 into particularly configured computing device that is operative to receive various forms of media content 214(1) to 214(N) from various content providers 212(1) to 212(N) and distribute it to various outward display devices (i.e., stationary or on CDVs). The convent viewership engine 204 can also receive data communication from computing devices (e.g., attached to) each outward display device, respectively, to receive media content viewership information therefrom, discussed in more detail later.

The content 214(1) to 214(N) may include, without limitation: text, pictures, video, audio, or any combination thereof. In various embodiments, the content providers 212(1) 212(N) may include law enforcement agency or a fire department, local municipality, etc., providing traffic guidance, warnings, and/or public service announcements (e.g., missing child alert, car stuck on the road ahead, poor weather conditions ahead, upcoming traffic delays, suggested reroute information, upcoming danger, etc.). In other scenarios, there may be highly localized advertisements, such as welcoming messages to a town (e.g., "Welcome to Orlando"), local businesses information for upcoming exit ("world renowned restaurant next exit"), or other advertisements. Content from advertisement agencies (e.g., 212(1)) related to general advertisements (e.g., 214(1)) are compatible with the architecture discussed herein. In some embodiments, a content provider can provide the media content directly to each outward display device without relying on the content viewership server 202.

In various embodiments, the content 214(1) to 214(N) may be the same or different for each zone, depicted by way of example in FIG. 2 as 220(1) to 220(N). As used herein, a location relates to specific coordinates, which may be obtained, for example, by way of global position signals or cell tower triangulation from a computing device in or of a subject CDV. As used herein a zone (e.g., 220(1), 220(2), or 220(N)) relates to an area where the received content (e.g., 203(1)) is displayed on an outward display of one or more CDVs or stationary displays.

The stationary displays are represented in FIG. 2 by rectangles having a crosshatch pattern (e.g., 227(1) and 227(2)). CDVs with outward displays are represented by vehicles having a crosshatch pattern (e.g., 227(N)). Each outward display device, whether associated with a CDV or stationary display, is coupled to a computing device that is operative to receive a data packet from other vehicles that are within a threshold distance of its outward display device, which can be used to determine media content viewership. The data packets can be received via a vehicular communication system which is a computer network in which vehicles and roadside units are used as communicating nodes, providing each other with information, such as safety warnings and traffic information. Such systems may be implemented in the context of an intelligent transportation system (ITS), providing a system of effectively avoiding accidents and traffic congestion. In one embodiment, such nodes are dedicated short-range communications (DSRC) devices, which operate in a predetermined frequency band (e.g., in 5.9 GHz band with bandwidth of 75 MHz and approximate range of 300 meters).

Accordingly, the vehicle to vehicle (V2V) communication described hereinabove enables vehicles to wirelessly exchange information about their speed, location, and heading. In some embodiments, the data packet provided by the V2V communication provides an identification of the vehicle. This identification may change over time (i.e., rolled ID) to avoid vehicle tracking over time.

The technology behind V2V communication allows vehicles to broadcast and receive omni-directional messages (e.g., several times per second), creating an envelope of awareness of other vehicles in a predetermined range (e.g., within a communication range of the vehicles). Vehicles that could use V2V communication technology range from cars, trucks, buses, motorcycles, bicycles, ships, etc. Pedestrian use is contemplated as well to enhance the safety of users and drivers. Vehicle information communicated need not identify the driver or vehicle, thereby avoiding vehicle tracking. However, a unique identifier may be assigned that may change over time, thereby avoiding counting the same vehicle multiple times for content viewership determination. Over time, an increasing number of vehicles may be equipped with such technology.

In one aspect, each computing device of an outward display device, whether part of a CDV or in stationary form, has a V2V receiver that is configured to receive the V2V communication via data packets, sometimes referred to herein as V2V safety message, via one or more sensors of the V2V receiver. The received data packet may comprise an identification of the vehicle and at least one of a speed, heading, location, length of time within a viewing range of the outward display device. As mentioned previously, the identification may be a rolled ID.

In various embodiments, the V2V communication may be based on an optical wireless communication technology using an LED transmitter and a camera receiver using a CMOS image sensor (i.e., optical communication image sensor (OCI)) and/or based on a radio frequency (RF) wireless communication technology using an RF transmitter (e.g., from a viewer vehicle) and RF receiver associated with an outward display device providing the media content. In one embodiment, the computing device of the outward display device receiving the V2V from a viewer vehicle can accurately calculate a length of time its media content on its outward display device was viewed, by a length of time the V2V communication is within a predetermined mutual range between the outward display device and the viewer vehicle.

In one embodiment, the content viewership engine 204 may receive a data packet from one or more CDVs, billboards, etc., over the network 206 that may include one or more of: a present location of the CDV, a direction of travel of the viewer vehicle, a timestamp, a length of time of the media consumption by the viewer vehicle, etc.

While the computing device of an outward display device, content providers 212(1) to 212(N), and content viewership server 202 are illustrated by way of example to be on different platforms, it will be understood that, in various embodiments, these platforms may be combined in different combinations. In other embodiments, these computing platforms may be implemented by virtual computing devices in the form of virtual machines or software containers that are hosted in the cloud 240, thereby providing an elastic architecture for processing and storage.

Example Content Viewership Scenario

Figure 3:
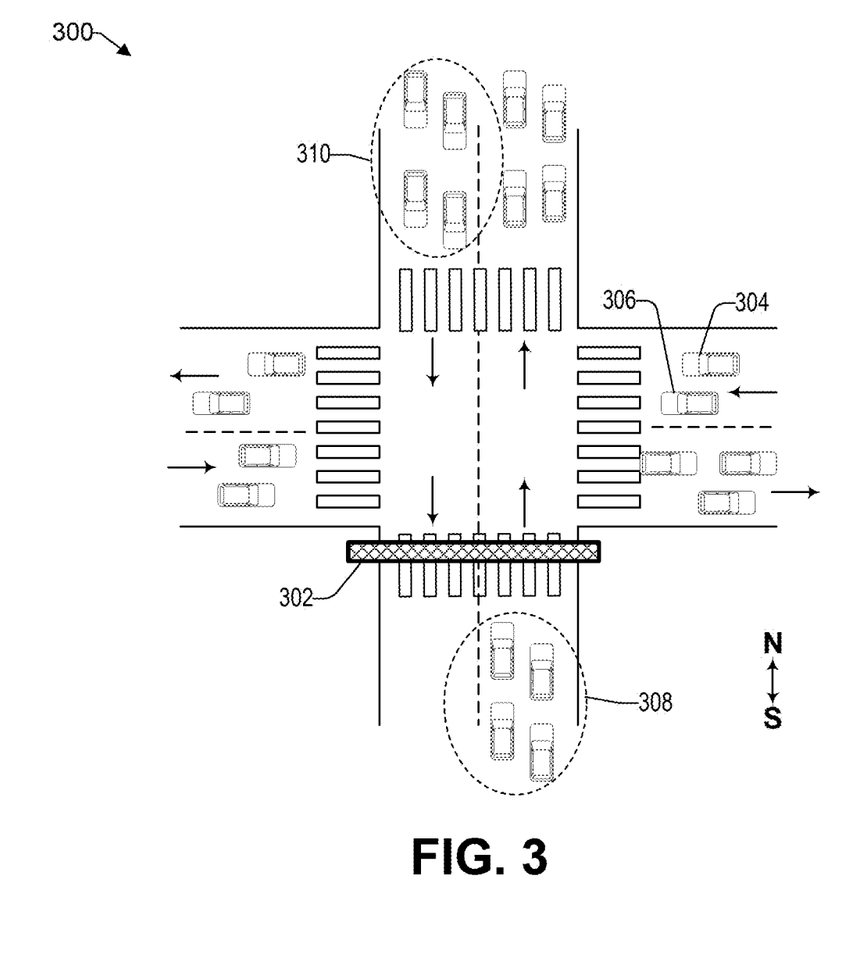
FIG. 3 illustrates an example intersection having an outward display device in the form of stationary display.

FIG. 3 illustrates an example intersection 300 having an outward display device 302 in the form of stationary display (e.g., a billboard). Each of the vehicles depicted in FIG. 3 may be within a V2V communication range of the outward display device 302. Accordingly, a computing device coupled to the outward display device 302 receives V2V communication in the form of data packets from each of the vehicles entering the zone of the intersection 300. For each vehicle in this zone, the data packet may include an identification (ID), a speed, a heading, and/or a length of time within a viewing range of the outward display device 302. Based on this data packet, the computing device of the outward display device 302 can determine which vehicles had an opportunity to view the content of the outward display device 302 and the duration thereof.

For example, if the outward display device 302 is configured to display both in the north and south directions, then the north bound vehicles 308 as well as the south bound vehicles 310 are identified as having viewed the content on the outward display device 302. In one embodiment, vehicles traveling in the proximity (i.e., V2V communication distance) of the outward display device 302 are not deemed to having viewed the content if their direction of travel is at an angle that is above a predetermined threshold (e.g., 45° to 90°) of the surface of the outward display device 302. In this embodiment, vehicles traveling east or west bound are not considered to be part of the viewing audience (i.e., not calculated in the count of vehicles exposed to the outward display device.)

For example, if the data packet received from the V2V communication indicates that vehicle 306 is making a left turn, it is regarded as part of the viewing audience. However, if vehicle 304 is identified as traveling straight (i.e., west) then vehicle 304 is not regarded as part of the viewing audience. It will be understood that these angles may be different based on the specific environment and terrain conditions.

The dwell time of the viewership is dependent upon a combination of the traffic flow and the duration that a vehicle is in a viewing range of the outward display device, which is extracted from the V2V communication. While by way of example FIG. 3 provides a scenario of a static outward display device 302, a substantially similar concept can be applied to mobile outward display devices of CDVs, discussed in more detail below.

Figure 4:
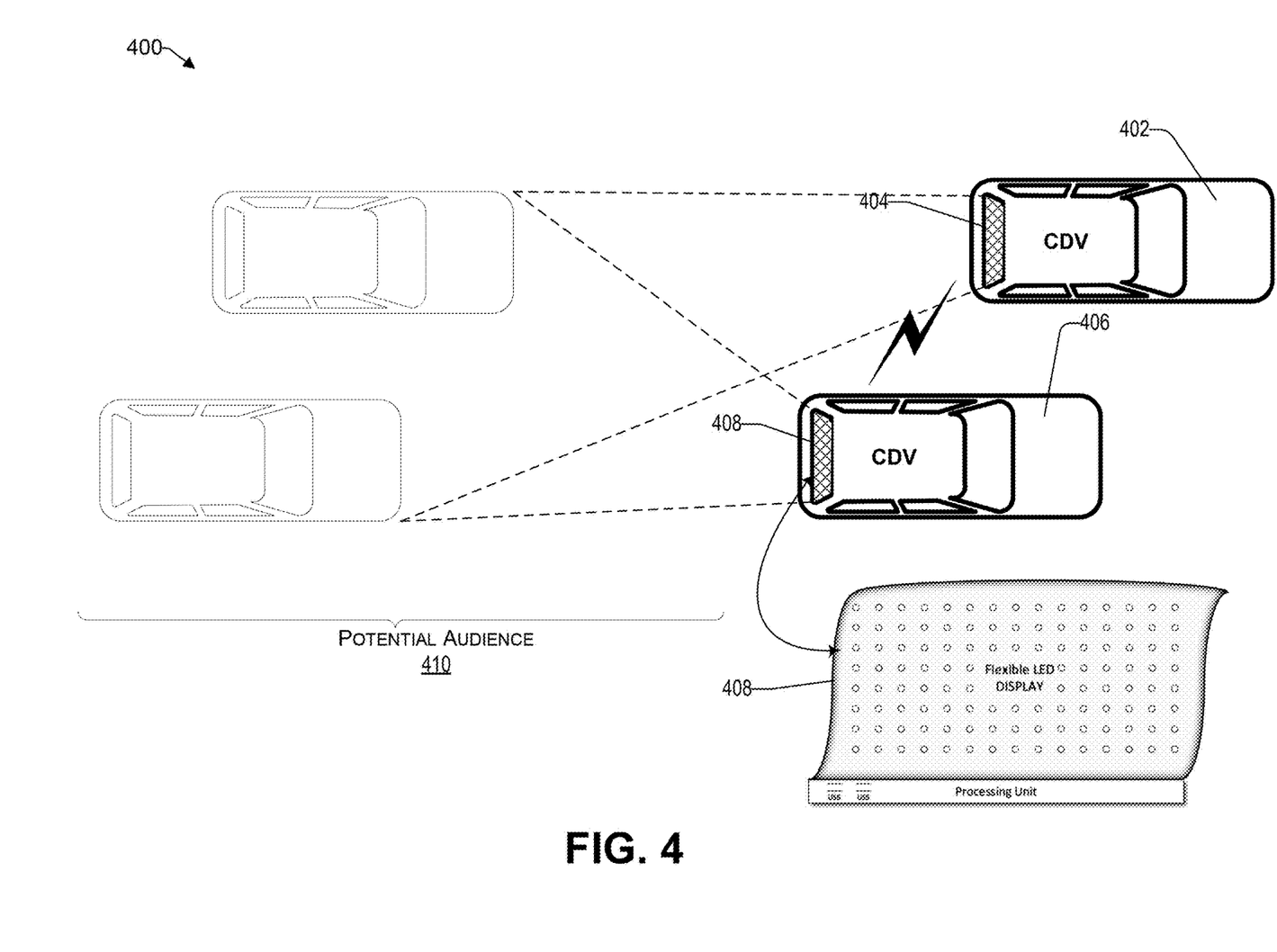
FIG. 4 illustrates a system of two content delivery vehicles having flexible outward display devices, consistent with an illustrative embodiment.

FIG. 4 illustrates a system 400 of two CDVs having flexible outward display devices. In one embodiment, the outward display devices are synchronized to each other. For example, CDVs 402 and 406 each have an outward display device in a form of a flexible LED display attached to a rear windshield. The potential audience includes any vehicles that are within a viewing distance of the synchronized flexible displays 404 and 408. The potential audience 410 CDVs 402 and 406 each include a V2V communications module. More specifically, the V2V communications module of the CDVs 402 and 406 includes a receiver that is configured to receive the V2V data packet from the potential audience 410. In this way, each CDV is able to calculate a net viewing time of the content displayed on the flexible displays 404 and 408, respectively.

In one embodiment, when the media content of the CDVs 402 and 406 is synchronized, then the viewing time of each vehicle is not counted double; rather, CDV display devices 404 and 408 are treated as a single display for calculating viewership time. In other embodiments, the processing unit 410 of a CDV sends the raw data of the V2V data packet to a content viewership engine on a remote content viewership server via a network, where the data packet is then processed, thereby conserving and/or reducing the processing requirements of the local processing unit of the CDVs.

In various embodiments, the system may use a redundant array of sensors combined with cameras, a LiDAR, a V2V radio, or any combination thereof, to detect the presence of vehicles and/or appropriately equipped pedestrians (e.g., having a computing device that supports the electronic communication discussed herein) within a given range of an out of home (OOH) media asset, combined with a processing system that processes the sensor data to reduce errors in count.

In one embodiment, if a sensor fails, the content viewership engine can detect failure of the malfunctioning sensor (e.g., by lack or inconsistent data removed therefrom) and remove its output from being processed into the viewership data, thereby improving the integrity of the data analysis provided. In one embodiment, the content viewership engine is capable of notifying its administrators of malfunctioning sensors/processors so that these may be repaired in a timely fashion. The viewership data can be uploaded to an online database that is accessible by authorized users (e.g., through a website). In one embodiment, the viewership data stream can also be integrated into a billing of content providers for automated billing based on actual viewership.

Example Process

Figure 5:
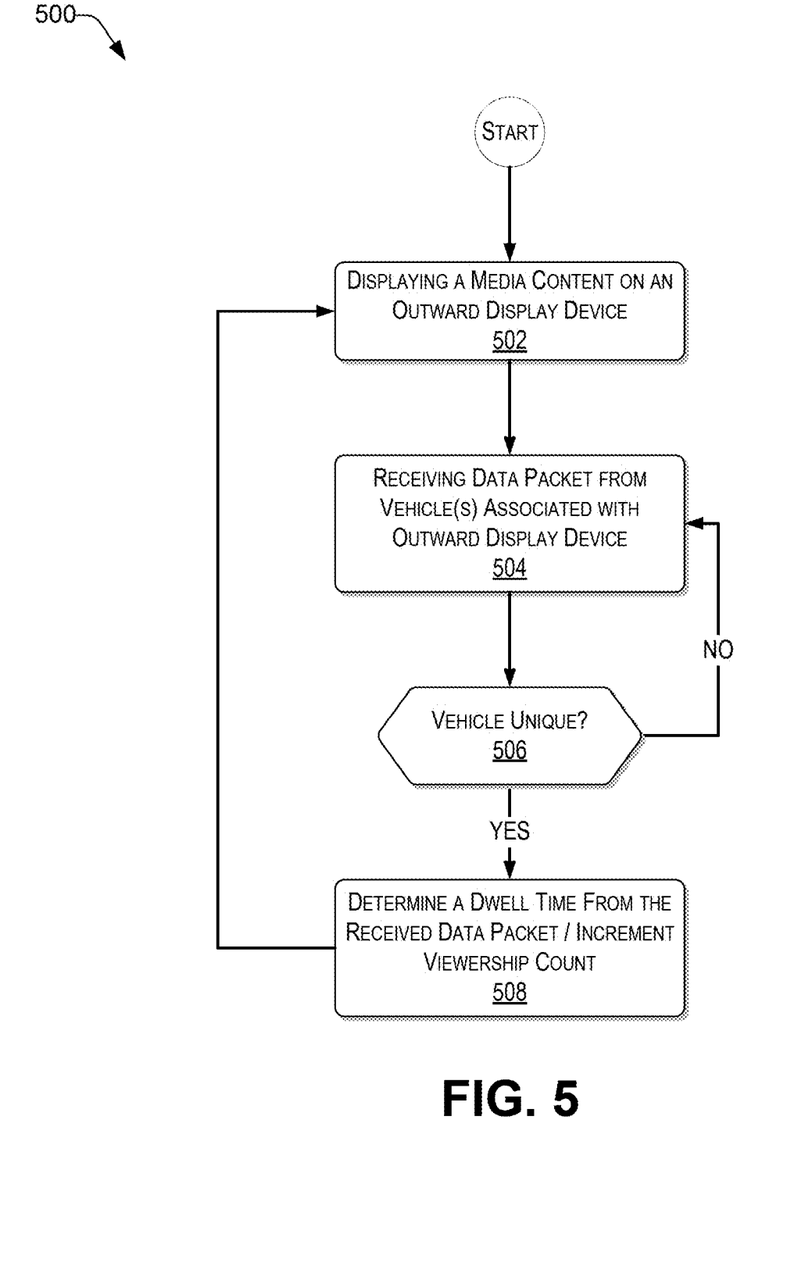
FIG. 5 presents an illustrative process of determining a viewership of a media content in a traffic environment.

With the foregoing overview of the example architecture 200 and example scenarios 300 and 400, it may be helpful now to consider a high-level discussion of an example process. To that end, FIG. 5 presents an illustrative process of determining a viewership of a media content in a traffic environment. Process 500 is illustrated as a collection of blocks in a logical flowchart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform functions or implement abstract data types. The order in which the operations are described is not intended to be construed as a limitation, and any number of the described blocks can be combined in any order and/or performed in parallel to implement the process. For discussion purposes, the processes 500 is described with reference to the architecture 200 of FIG. 2.

A media content is distributed to one or more outward content display devices, which may be in different regions. At block 502, a computing device coupled to a content display device, displays a media content on an outward display device. The content may be static or dynamic. In various embodiments, the outward display device may be on a content delivery vehicle (CDV) or be a substantially stationary billboard (e.g., typically does not move).

At block 504, for each vehicle in a predetermined range of the outward display device, a data packet is received by a receiver associated with the content display device. The data packet includes data harvested by one or more sensors of the vehicle. In one embodiment the data packet comprises a vehicle to vehicle (V2V) safety message from the corresponding vehicle. The data packet may include an identification of the vehicle and at least one of a speed, heading, location, or length of time within a viewing range of the outward display device. The identification may change over time (i.e., rolled ID). In this way, vehicle tracking is avoided while viewership is not over-counted. In one embodiment, the data packet is received via a V2V receiver associated with the outward display device.

In various embodiments, the V2V communication between the viewing vehicle and the outward display device may be based on an optical wireless communication technology using an LED transmitter and a camera receiver employing a CMOS image sensor (optical communication image sensor (OCI) and/or a radio frequency wireless communication technology using an RF transmitter (from the viewing vehicle) and an RF receiver (associated with the outward display device being viewed by the viewing vehicle).

At block 506, it is determined whether the vehicle is unique based on the received data packet. If not (i.e., "NO" at determination block 506), the process returns to block 504 to continue receiving data packet(s) from vehicles within a communication distance from the outward display device. However, upon determining that the vehicle is unique (i.e., "YES" at determination block 506) by way of the received data packet, the process continues with block 508.

At block 508, the viewership count is incremented. In one embodiment, a dwell time of the viewing vehicle is extracted from the received data packet. In this way, an accurate assessment of dwell time with respect to a media content can be determined.

Example Computer Platform

Figure 6:
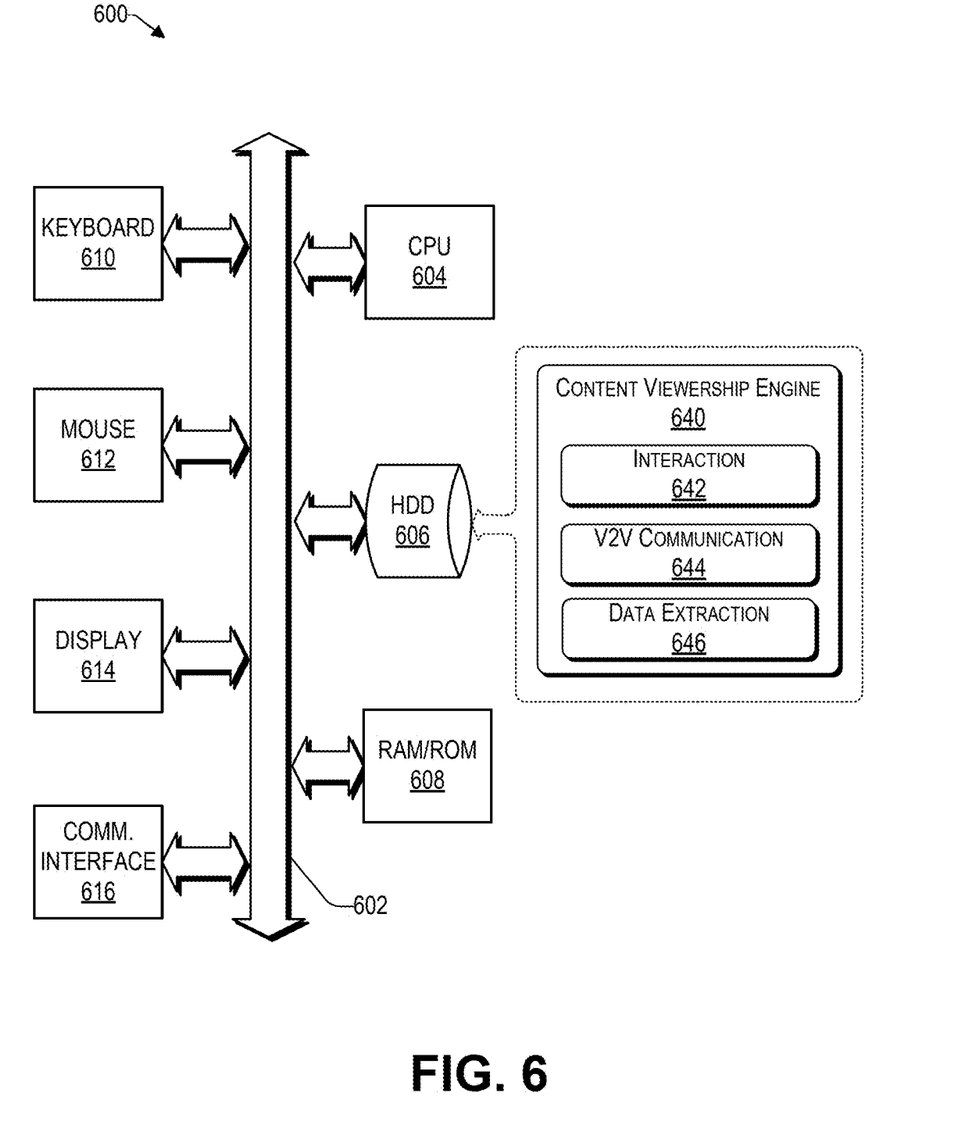
FIG. 6 is a functional block diagram illustration of a computer hardware platform that can be used to implement a computing device associated with an outward display device, consistent with an illustrative embodiment.

As discussed above, functions relating to assessing an accurate viewership of a media content can be performed with the use of one or more computing devices connected for data communication via wireless or wired communication, as shown in FIG. 2 and in accordance with the process 500 of FIG. 5. FIG. 6 is a functional block diagram illustration of a computer hardware platform that can be used to implement a computing device associated with an outward display device, consistent with an illustrative embodiment. Computing platform 600 can communicate with various networked components, such as other computing devices of CDVs, content providers 212(A), the cloud 240, and other devices coupled to the network 206. In one example, FIG. 6 illustrates a network or host computer platform 600, as may be used to implement a server, such as the content viewership server 202 of FIG. 2.

The computer platform 600 may include a central processing unit (CPU) 604, a hard disk drive (HDD) 606, random access memory (RAM) and/or read only memory (ROM) 608, a keyboard 610, a mouse 612, a display 614, and a communication interface 616, which are connected to a system bus 602.

In one embodiment, the HDD 606, has capabilities that include storing a program that can execute various processes, such as the content viewership engine 640, in a manner described herein. The content viewership engine 640 may have various modules configured to perform different functions. For example, there may be an interaction module 642 that is operative to communicate with various content providers to receive media content therefrom. There may be a V2V communication module 644 operative to receive V2V data packages from vehicles that are within a communication distance from the computing device 600. There may be a data extraction module 646 operative to extract various relevant data from the V2V data packages, such as (without limitation) a (e.g., temporary) ID, speed, heading, location, and/or dwell time of a viewing vehicle with respect to a media content provided on an outward display device.

CONCLUSION

The descriptions of the various embodiments of the present teachings have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing has described what are considered to be the best state and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

The components, steps, features, objects, benefits and advantages that have been discussed herein are merely illustrative. None of them, nor the discussions relating to them, are intended to limit the scope of protection. While various advantages have been discussed herein, it will be understood that not all embodiments necessarily include all advantages. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Numerous other embodiments are also contemplated. These include embodiments that have fewer, additional, and/or different components, steps, features, objects, benefits and advantages. These also include embodiments in which the components and/or steps are arranged and/or ordered differently.

Aspects of the present disclosure are described herein with reference to a flowchart illustration and/or block diagram of a method, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures herein illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing has been described in conjunction with exemplary embodiments, it is understood that the term "exemplary" is merely meant as an example, rather than the best or optimal. Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments have more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A computing device comprising:
a processor;
a network interface coupled to the processor to enable communication over a network;
a receiver coupled to the processor;
an outward display device coupled to the processor;
a storage device coupled to the processor;
a content viewership engine stored in the storage device, wherein an execution of the engine by the processor configures the computing device to perform acts comprising:
displaying a media content on the outward display device;
for each vehicle in a predetermined range of the outward display device:
receiving a data packet comprising data from one or more sensors of the vehicle;
determining whether the vehicle is unique based on the data packet;
upon determining that the vehicle is not unique, going back to receiving a data packet for each vehicle in a predetermined range of the outward display device; and
upon determining that the vehicle is unique, determining from the data packet a dwell time of the vehicle with respect to the displayed media content on the outward display device.

2. The computing device of claim 1, wherein the outward display device is on a content delivery vehicle (CDV).

3. The computing device of claim 1, wherein the outward display device is a stationary billboard.

4. The computing device of claim 1, wherein the displayed media content is received from one or more content providers comprising a police department, a fire department, or a municipality.

5. The computing device of claim 1, wherein the data packet comprises a vehicle to vehicle (V2V) safety message from a corresponding vehicle.

6. The computing device of claim 1, wherein the execution of the engine by the processor further configures the computing device to perform an additional act comprising, for each vehicle: determining an identification (ID) of the vehicle and at least one of a speed, a heading, a location, or a dwell time of the media content by the vehicle.

7. The computing device of claim 6, wherein the ID is a rolled ID that avoids a tracking of the corresponding vehicle.

8. The computing device of claim 1, wherein the receiver of the computing device is a vehicle-to-vehicle (V2V) receiver.

9. The computing device of claim 8, wherein the V2V receiver comprises an optical wireless communication technology module using a light emitting diode (LED) transmitter and a camera receiver using a complementary metal oxide semiconductor (CMOS) image sensor.

10. The computing device of claim 8, wherein the V2V receiver is based on a radio frequency (RF) wireless communication technology using an RF receiver.

11. A non-transitory computer readable storage medium tangibly embodying a computer readable program code having computer readable instructions that, when executed, causes a computer device to carry out a method of determining a viewership of a media content, the method comprising:
displaying a media content on an outward display device;
for each vehicle in a predetermined range of the outward display device:
receiving a data packet comprising data from one or more sensors of the vehicle;
upon determining that the vehicle is not unique, going back to receiving a data packet for each vehicle in a predetermined range of the outward display device; and
upon determining that the vehicle is unique, determining from the data packet a dwell time of the vehicle with respect to the displayed media content on the outward display device.

12. The non-transitory computer readable storage medium of claim 11, wherein the outward display device is on a content delivery vehicle (CDV).

13. The non-transitory computer readable storage medium of claim 11, wherein the outward display device is a stationary billboard.

14. The non-transitory computer readable storage medium of claim 11, wherein the displayed media content is received from one or more content providers comprising a police department, a fire department, or a municipality.

15. The non-transitory computer readable storage medium of claim 11, wherein the data packet comprises a vehicle to vehicle (V2V) safety message from a corresponding vehicle.

16. The non-transitory computer readable storage medium of claim 11, further comprising, for each vehicle: determining an identification (ID) of the vehicle and at least one of a speed, a heading, a location, or a dwell time of the media content by the vehicle.

17. The non-transitory computer readable storage medium of claim 11, wherein the data packet is received by a vehicle to vehicle (V2V) receiver comprising an optical wireless communication technology module using a light emitting diode (LED) transmitter and a camera receiver using a complementary metal oxide semiconductor (CMOS) image sensor.

18. The non-transitory computer readable storage medium of claim 11, wherein the data packet is received by a vehicle to vehicle (V2V) receiver comprising a radio frequency (RF) wireless communication technology using an RF receiver.

19. A computer implemented method comprising:
displaying a media content on an outward display device;
for each vehicle in a predetermined range of the outward display device:
receiving a data packet comprising data from one or more sensors of the vehicle;
determining whether the vehicle is unique based on the data packet; and
determining from the data packet a dwell time of the vehicle with respect to the displayed media content on the outward display device.

20. The non-transitory computer readable storage medium of claim 19, wherein the data packet comprises a vehicle to vehicle (V2V) safety message from a corresponding vehicle.

* * * * *